US008500898B2

(12) United States Patent
Raunig et al.

(10) Patent No.: US 8,500,898 B2
(45) Date of Patent: Aug. 6, 2013

(54) YTTRIA-BASED SLURRY COMPOSITION

(75) Inventors: Sigrun Raunig, Veit an der Glan (AT); Peter Janz, Graz (AT)

(73) Assignee: Treibacher Industrie AG, Treibach-Althofen (AT)

( * ) Notice: Subject to any disclaimer, the term of this patent is extended or adjusted under 35 U.S.C. 154(b) by 27 days.

(21) Appl. No.: 13/377,786

(22) PCT Filed: Jun. 11, 2010

(86) PCT No.: PCT/AT2010/000208
§ 371 (c)(1),
(2), (4) Date: Feb. 24, 2012

(87) PCT Pub. No.: WO2010/141971
PCT Pub. Date: Dec. 16, 2010

(65) Prior Publication Data
US 2013/0065749 A1   Mar. 14, 2013

(30) Foreign Application Priority Data

Jun. 12, 2009  (EP) .................................... 09450116

(51) Int. Cl.
B28B 7/36   (2006.01)
C04B 35/505   (2006.01)
B01F 3/12   (2006.01)

(52) U.S. Cl.
USPC ......... 106/38.27; 106/38.3; 501/152; 516/33; 516/34; 164/528; 164/529

(58) Field of Classification Search
USPC ................ 106/38.27, 38.3; 501/103, 105, 501/152; 516/33, 34; 164/528, 529
See application file for complete search history.

(56) References Cited

U.S. PATENT DOCUMENTS

| | | | |
|---|---|---|---|
| 4,057,433 | A | 11/1977 | Brown |
| 4,740,246 | A | 4/1988 | Feagin |
| 4,947,927 | A | 8/1990 | Horton |
| 5,464,797 | A | 11/1995 | Yasrebi et al. |
| 5,624,604 | A | 4/1997 | Yasrebi |
| 5,827,791 | A | 10/1998 | Pauliny et al. |
| 6,390,179 | B1 | 5/2002 | Yasrebi et al. |

(Continued)

FOREIGN PATENT DOCUMENTS
EP     1 992 430     11/2008

OTHER PUBLICATIONS

Cesarano and Aksay "Stability of Aqueous Alpha-$Al_2O_3$ Suspensions with Poly-(methacrylic acid) Polyelectrolyte", J.Am. Ceram. Soc. 71, p. 250-255 (1988), Abstract enclosed.

(Continued)

*Primary Examiner* — Karl Group
(74) *Attorney, Agent, or Firm* — Workman Nydegger

(57) ABSTRACT

An yttria-based slurry composition comprising yttria, an aqueous silica binder system or an aqueous ammonium zirconium carbonate binder system and a fluorine compound, which is selected from ammonium fluoride, ammonium hydrogen difluoride, sodium fluoride, potassium fluoride, sodium hydrogen difluoride and/or potassium hydrogen difluoride and a method of stabilizing an yttria-based slurry composition comprising yttria and an aqueous silica binder system or an aqueous ammonium zirconium carbonate binder system which method comprises treating the composition, preferably treating the binder system, with a fluorine compound which is selected as indicated above.

12 Claims, 15 Drawing Sheets

(56) References Cited

U.S. PATENT DOCUMENTS

| | | | |
|---|---|---|---|
| 8,025,094 B2 * | 9/2011 | Janz et al. | 164/519 |
| 8,372,769 B2 * | 2/2013 | Janz et al. | 501/152 |
| 2008/0119347 A1 | 5/2008 | Sturgis et al. | |

OTHER PUBLICATIONS

Hideaki Hamano et al, Langmuir 2000, 16, 6961-6967, Abstract enclosed, Jul. 2000.

Graule et al. "Stabilization of Alumina Dispersions with Carboxyclic Acids", Euro-Ceramics II, vol. I, Edited by G. Ziuegler & H. Hausner, DKG 1993, p. 299-305.

Graule et al, "Stabilization of Alumina Dispersions with Carboxylic Acids", Proceedings of the Second European Ceramic Society Conference (1991).

* cited by examiner

YTTRIA-BASED SLURRY COMPOSITION

BACKGROUND OF THE INVENTION

1. Field of the Invention

The present invention concerns an yttria-based slurry composition, e.g. useful for producing slurries needed for the production of ceramic molds for use in casting reactive metals.

2. Description of Prior Art

Aqueous suspensions of ceramic particles, such as yttrium oxide (yttria), zirconium oxide (zirconia), aluminium oxide (alumina), yttria-alumina-zirconia, and zircon ($ZrSiO_4$) are used industrially to form ceramic articles due to their suitability for use as structural materials at high temperatures. These refractory materials often are also used for casting super alloys and reactive metals. An example of such a reactive metal is titanium. Titanium normally reacts with materials used to form the mould, such as oxides, thereby releasing oxygen and forming oxygen-enriched titanium.

A suspension is a system in which typically solid particles are uniformly dispersed in a liquid such as water. Such suspensions are used as ceramic slurries for different purposes, as mentioned above. Ceramic particles normally are at least partially soluble in water. Furthermore ceramic particles tend to hydrate, forming a bond with water. To what extent and how quickly ceramic particles dissolve or hydrate, varies. Moreover, colloidal particles of ceramic particles may agglomerate in water. The extent to which ceramic particles dissolve, hydrate or agglomerate in water based systems depends on many factors, including the nature of the ceramic powder, the oxidation state of the ceramic particle, the pH, the temperature of the system and the dispersants which are used in a ceramic slurry.

A lot of methods are known in the art to stabilize colloidal suspensions, i.e. preventing the suspensions from agglomerating, while simultaneously reducing the dissolution and hydration rates. For instance, three known mechanisms in stabilization procedure include electrostatic, steric and electrosteric mechanisms. These mechanisms e.g. are reviewed in detail by Cesarano and Aksay "Stability of Aqueous Alpha-$Al_2O_3$ Suspensions with Poly-(methacrylic acid) Polyelectrolyte", J. Am. Ceram. Soc. 71, p 250-255 (1988).

For yttria prime slurries currently used in industry, there are two general approaches to overcome the tendency for ions liberated by the relatively rapid dissolution of yttria under lower pH conditions. In one, addition of organic bases such as tetraethylammoniumhydroxide to ceramic slurries, e.g. to an yttria slurry, helps preventing the dissolution of silica at high pH levels which are necessary to keep the slurry stable (US 2008/0119347). Other approaches have been to "alloy" the yttria with other non-reactive oxides in a fusion process which tends to reduce the number of dissolution sites on the yttria particles or to coat the yttria with large adsorbed organic molecules or anorganic compounds to achieve the same result: a stable slurry with a relatively long shelf life.

In EP 1 992 430 an yttria based refractory composition is described, obtainable by mixing particles of yttria-based ceramic material and a fluorine containing dopant, and heating the resulting mixture to effect fluorine doping of said yttria based ceramic material to produce stable slurries with a significant improved shelf life in aqueous binder systems. Fluorine-doping of the binder system is not indicated.

In US. 2008/0119347 there is disclosed a mold system for coating reactive alloys by using novel prime coat slurries to form molds or "shells" as they are otherwise known for casting reactive metal components.

According to U.S. Pat. No. 5,621,601 beside colloidal dispersing it seems to be important to reduce the rate of dissolution and/or hydration of colloidal ceramic suspensions to obtain commercially suitable ceramic slurries.

Ceramic materials normally react with water and either partially dissolve (referred to as dissolution or solvation) or form hydrates. The extent of dissolution or hydration varies among different ceramic materials. As ceramic materials dissolve, the dissolved species may substantially change the ionic strength of the solution and consequently particles may agglomerate. In the case of particle hydration, some ceramic particles form a hydroxide surface layer. However, attack by water also may proceed beyond the surface layer and may advance into the body of particles. As a result, size, morphology and the crystal phase of particles may change.

In Hideaki Hamano et al, Langmuir 2000, 16, 6961-6967 the protection of a $Nd_2O_3$ sample from hydration by surface fluoridation carried out by stirring the $Nd_2O_3$ sample in an aqueous solution of $NH_4F$ is described.

In many commercially important ceramic particles, such as alumina (e.g. $Al_2O_3$), zirconia (e.g. $ZrO_2$), and zircon ($ZrSiO_4$) to name a few, the dissolution rate and the extent to which dissolution proceeds is low enough so that it does not seem to interfere with their aqueous commercial use, at least under mild acidic or basic conditions such as from about pH 3 to about pH 11. Furthermore, hydration does not seem to form more than a thin surface layer, at least when the particle size is equal to or larger than one micrometer. However, other commercially important ceramic particles, such as magnesia (MgO), yttria-alumina-zirconia, and yttria (e.g. $Y_2O_3$), dissolve in aqueous media to a much larger extent and at faster rates than the ceramic materials discussed above. As a result, aqueous processing of these materials such as magnesia, calcia, yttria, yttria-alumina-zirconia is either difficult or even not practicable.

Many attempts have been made by persons skilled in the art of ceramic processing to reduce the dissolution and hydration of ceramic particles, while simultaneously keeping the ceramic particles dispersed (unagglomerated) in suspensions. For example, in U.S. Pat. No. 4,947,927 it is taught that by adjusting the pH of an yttria slurry to high pH values in excess of pH 11 one can make yttria intrinsically less soluble in water, thereby decreasing its sensitivity to water attack.

It seems that, compared to electrostatic stabilization, electrosteric stabilization provides a better method for simultaneously dispersing colloidal particles in suspension and reducing water attack on the ceramic surface.

Monomers have been used to prevent the agglomeration of alumina suspensions, e.g. according to Graule et al. "Stabilization of Alumina Dispersions with Carboxyclic Acids", Proceedings of the Second European Ceramic Society Conference (1991).

In U.S. Pat. No. 5,624,604 a method for dispersing and reducing the rate of dissolution and/or hydration of colloidal ceramic suspensions is described by adding a non polymeric hydroxylated organic compound to a ceramic suspension. The ceramic suspension typically comprises a colloidal suspension of a metal oxide wherein the metal of the metal oxide is an alkali metal, alkaline-earth metal or rare-earth metal but preferably is magnesium, calcium or a rare-earth metal.

Other methods for increasing the lifetime of a casting slurry e.g. are described in U.S. Pat. No. 6,390,179 according to which one feature of the invention is processing refractory powders at a first hydration level to produce powders having a second, lower hydration level before the processed materials are used to form casting slurries. Processing according to the disclosed methods results in a substantial increase in the lifetime of a slurry made using such processed materials compared to slurries made using materials not processed as described therein.

In U.S. Pat. No. 5,464,797 an aqueous ceramic slurry having from about 70-weight percent to about 85 weight percent of a fused yttria-zirconia material is described. The weight-percent of zirconia in the fused yttria-zirconia preferably varies from about 1.0 weight percent to about 10 weight percent. The slurries are used to form ceramic mold facecoatings for casting reactive materials. These slurries are less sensitive to pH-fluctuations than slurries made from 100 percent yttria (yttria slurries).

Thus, it is understood that persons skilled in the art of ceramic processing have long searched for, and developed methods to increase the lifetime of casting slurries. Despite the prior inventions directed to this objective, there still is a need for convenient and practical methods for increasing the useful lifetimes of investment casting slurries in particular when using binder systems as e g Ammonium Zirconium Carbonate, Zirconium Acetate, or colloidal silica to process such slurries.

In U.S. Pat. No. 5,827,791 yttria-based slurries for use in producing ceramic molds for use in the investment casting of reactive metals are described, particulary titanium and titanium alloys, where the specific preferred binders amongst colloidal silica are ammonium zirconium carbonate and zirconium acetate.

In U.S. Pat. No. 4,740,246 relatively unreactive mold coatings with titanium and titanium alloys that are prepared from zirconia or yttria sols, or mixtures thereof as a binder for refractory composition, such as zirconium oxide, yttrium oxide and mixtures thereof are disclosed. An example is indicated, according to which a cast-sample was made of a slurry containing yttrium oxide and zirconium acetate as essential parts. This sample is very low in alpha case being less than 0.001 inch (0.0254 mm)

From U.S. Pat. No. 4,057,433 a mold for casting molten reactive metals is known, which has a facing portion comprising finely divided particles of oxyfluorides of metals of Group Ma and a back-up portion comprising finely divided particles of shell mold back-up material.

DETAILED DESCRIPTION OF THE INVENTION

The present invention provides new yttria-based slurry compositions for increasing the lifetime of casting slurries.

In one aspect the present invention provides a slurry composition comprising 50 to 85 wt. % of yttria and 15 to 50 wt. % of an aqueous silica binder system or an aqueous ammonium zirconium carbonate binder system which binder system comprises 0.05 to 15 wt. % of a fluorine compound, wherein the fluorine compound is selected from ammonium fluoride, ammonium hydrogen difluoride, sodium fluoride, potassium fluoride, sodium hydrogen difluoride and/or potassium hydrogen difluoride.

A composition (compositions) provided by the present invention is herein also designated as "composition(s) of (according to) the present invention".

In one preferred aspect a composition of the present invention comprises ammonium fluoride as the fluorine compound. In another preferred aspect a composition of the present invention comprises ammonium hydrogen difluoride as the fluorine compound. In another preferred aspect a composition of the present invention comprises sodium fluoride as the fluorine compound. In another preferred aspect a composition of the present invention comprises potassium fluoride as the fluorine compound. In another preferred aspect a composition of the present invention comprises sodium hydrogen difluoride as the fluorine compound. In another preferred aspect a composition of the present invention comprises potassium hydrogen difluoride as the fluorine compound.

In a composition of the present invention the term 'yttria' includes practically pure yttria, e.g. fused yttria, e.g. calcined yttria, e.g. in the form of an yttria flour, yttria-based (refractory) compositions (powders), which compositions optionally are doped with fluorine, e.g. in an amount of fluorine effective to reduce the dissolution rate of the refractory powder, and yttria in combination with other metal oxides, e.g. in the form of a solid solution.

Fused yttria includes yttria with high density, such as yttria obtainable by heating, e.g. in a sintering process, e.g. under hydrogen atmosphere or in vacuo and high temperatures of approximately 2000 to 2200° C. If further metal oxide components are present, "fused" as used herein means also heating the solid individual refractory components to form a homogeneous molten solution.

Yttria based compositions include yttria based refractory compositions, including yttria based powders which exhibit a significantly reduced rate of dissolution and/or hydration, when used in ceramic suspensions. Yttria based refractory compositions also encompasses yttria-based refractory compositions doped with an amount of fluorine of up to 7.5 wt %. Yttria based refractory compositions optionally doped with an amount of fluorine are e.g. disclosed in EP 1 992 430 and are e.g. obtainable by (a) mixing particles of yttria. e.g. particles of an yttria-based ceramic material, and a fluorine containing dopant, and
(b) heating the resulting mixture to effect fluorine-doping of said yttria-based ceramic material.

"Yttria-based (refractory) composition, yttria-based ceramic material or yttria-based powder" as used herein means that the composition, material or powder comprises at least 50 wt. % of yttria and a composition of the present invention is also designated herein as "yttria-based".

The particles. e.g. the yttria-based ceramic material of a) may comprise other metal oxides, e.g. said yttria-based ceramic material may comprise 50-100 wt % $Y_2O_3$ and other metal oxides, such as alumina and/or zirconia, e.g. 0-50 wt % $Al_2O_3$ and 0-50 wt % $ZrO_2$, e.g. said yttria-based ceramic material may comprise $Y_2O_3$, a Y/Al/Zr-oxide, a Y/Al-oxide or a Y/Zr-oxide or combinations thereof, optionally doped with a fluorine containing compound, e.g. selected from $YF_3$, $AlF_3$, $ZrF_4$, a lanthanide fluoride and/or a zirconiumoxyfluoride.

"Solid solution" as used herein means a homogenous solidified mass resulting from the solidification of the refractory components that have been combined and melted to form a homogeneous molten solution.

Solid solutions of yttria with other metal oxides e.g. include a solid solution of at least 50 wt % yttria, e.g. and further including other metal oxides, e.g. alumina and/or zirconia, e.g. 0 to 50 wt % alumina and/or 0 to 50 wt % zirconia.

In a preferred embodiment fluorine doped yttria-based powders are produced as follows: Appropriate quantities of fused block material of yttria are milled for 30 minutes in an yttria stabilized $ZrO_2$-lined ball mill (ZOZ GmbH TYP COMB 03-A039). Therefore 24.5 kg 1.25" (=31.75 mm) grinding-balls (Yttria stabilized Zirconium Oxide) are used. After the addition of appropriate quantities of fluorine containing dopant the powder mixture is milled for another certain time interval (e.g. if $YF_3$ is used for 100 min, if Zirconiumoxyfluoride $Zr_7O_{8.79}F_{9.71}$—supplier: Bao Tou Jing Rui New Material Co., LTD—is used for 90 min) The milled product is sieved <75 µm and then calcined (Nabertherm C250; 3.0 kg per Al$_2$O$_3$(0.9)-mullite(0.1)-crucible). The heating rate is 1.1° C./min up to a temperature of 400° C. that was maintained for 4 hours.

Yttria as provided according to the present invention is combined with an aqueous binder system and a slurry is formed. Preferably the fluorine compound is added to the binder system prior to adding the yttria.

An aqueous binder system which may be used according to the present invention comprises water and silica or water and ammonium zirconium carbonate (AZC).

Silica or ammonium zirconium carbonate as a binder in ceramic compositions are e.g. described in U.S. Pat. No. 5,827,791.

In a composition of the present invention the fluorine compound is selected from ammonium fluoride, ammonium hydrogen difluoride, sodium fluoride, potassium fluoride, sodium hydrogen difluoride and/or potassium hydrogen difluoride, preferably ammonium fluoride is used.

A composition of the present invention in a particular aspect comprises per 100 parts of yttria 15 to 35 parts of an aqueous silica binder system or an aqueous ammonium zirconium carbonate binder system and 0.001 to 5 parts of the fluorine compound.

Without limiting the scope of this invention to one theory of operation, it is currently believed that the fluorine compound functions as a hydration and/or dissolution suppressant for the yttria based refractories to prevent premature gelation of the slurry.

For the preparation of a composition of the present invention the fluorine compound is added to the binder system used, e.g. before the final preparation of the casting slurries.

A composition of the present invention comprises the fluorine compound in an appropriate amount.

An appropriate amount of the fluorine compound is in one aspect such that the fluorine compound is dissolved in the binder system used.

An appropriate amount of the fluorine compound is in another aspect such that the binder system used remains free from precipitation upon addition of the fluorine compound for at least 2 hours at room temperature.

An appropriate amount is in another aspect e.g. such that the binder system used remains free of gelation upon addition of the fluorine compound for at least 2 hours at room temperature.

Preferably the amount of fluorine compound is such, that the binder system used remains free from precipitation upon addition of the fluorine compound for at least 2 hours at room temperature and such, that the binder system used remains free of gelation upon addition of the fluorine compound for at least 2 hours at room temperature.

A composition of the present invention is preferably formed by mixing an aqueous based binder that contains the fluorine compound with yttria in a ceramic powder, e.g. yttria, yttria-alumina-zirconia, yttria-alumina or yttria-zirconia, wherein yttria is optionally fluorine doped yttria.

A composition of the present invention preferably comprises at least 50% by weight (50 wt. %) of yttria.

A preferred composition of the present invention comprises per 100 parts of yttria, 15 to 35 parts of an aqueous binder system, e.g. an aqueous silica binder system and/or an aqueous ammonium zirconium carbonate binder system, and 0.001 to 5 parts of the fluorine compound.

Particularly, an appropriate amount of the fluorine compound may be dependent from the selected binder system and from the selected fluorine compound used.

In general, the binder system comprises 0.05 to 15 wt. %, such as 0.1 to 15 wt. % of the fluorine compound.

E.g. if the binder system is AZC, preferably the binder system contains 0.05 to 15 wt. % of the fluorine compound, e.g. if the binder system is AZC and NH$_4$F is used as the fluorine compound, appropriate amounts include preferably 0.05 to 15 wt. %, more preferably 0.1 to 13.5 wt. % NH$_4$F in the binder system;

and NaF is used as the fluorine compound, appropriate amounts include preferably 0.1 to 1.5 wt. %, more preferably 0.1 to 1.0 wt. %, such as 0.1 to 0.7 wt. % of NaF in the binder system;

and NH$_4$HF$_2$, NaHF$_2$ or KHF$_2$ are used as the fluorine compound, appropriate amounts include preferably 0.1 to 15% wt. %, such as 1 to 10% wt. % of NH$_4$HF$_2$, NaHF$_2$ or KHF$_2$ in the binder system.

E.g. if the binder system is colloidal silica, preferably the binder system contains 0.05 to 10 wt. %, such as 0.2 to 1.0 wt. % of the fluorine compound, e.g. if the binder system is colloidal silica and NH$_4$F is used as the fluorine compound, appropriate amounts include preferably 0.1 to 5% wt. %, such as 0.2 to 1.0 wt. %; NH$_4$F in the binder system;

and NaF, NaHF$_2$, NH$_4$HF$_2$, KF, or KHF$_2$ are used as the fluorine compound, appropriate amounts include preferably 0.1 to 10 wt. %, e.g. 0.1 to 1 wt. % of NaF, NaHF$_2$, NH$_4$HF$_2$, KF, or KHF$_2$ in the binder system.

A composition of the present invention may be prepared by mixing the fluorine compound containing aqueous based binder system with yttria-based refractory flour and optionally other ingredients. Other ingredients include such as described herein and ingredients which may be useful in such composition, e.g. such as usual in the Investment casting industry.

In another aspect the present invention provides a method of stabilizing an yttria-based slurry composition comprising 50 to 85 wt. % of yttria and 15 to 50 wt. % of an aqueous silica binder system or an aqueous ammonium zirconium carbonate binder system which method comprises treating the composition, preferably treating the binder system, with a fluorine compound in an amount of 0.05 to 15 wt. % of the binder system used, wherein the fluorine compound is selected from ammonium fluoride, ammonium hydrogen difluoride, sodium fluoride, potassium fluoride, sodium hydrogen difluoride and/or potassium hydrogen difluoride and optionally mixing the mixture of the binder system comprising the fluorine compound with yttria.

The slurry lifetimes of a composition of the present invention and of comparative compositions is sdetermined by measurment of the torque (Method A) and/or by measurement of the cinematic viscosity using Zahn Cup.

1. Measurement of the Torque—Method A

The experimental setup consists of double jacket assay container made of stainless steel (inner diameter=5 cm, external diameter=7 cm), a Plexiglas cap and sealing member (stainless steel) therefore. In the middle of the cap there is a hole (bore=0.9 cm) for the mixer (shaft diameter=0.8 cm). The cap is sealed up with a grommet agitator (IKA EUROSTAR power control-visc P4) and a horseshoe mixer (width=4.5 cm, altitude=5.5 cm)

measuring instrument for detecting the dynamic torque, which acts on the agitating element (IKA VISKOKLICK® VK 600 control). The measuring unit transforms the dynamic into a static torque thermostat (LAUDA ecoline RE 106)

software labworldsoft 4.01

First the slurry which is either a slurry of the present invention, e.g. as described in the examples below, or is a comparative slurry as described in the comparative examples below, is formulated and then filled into the double jacket assay container, which is temperature controlled at 25° C. by a thermostat. The agitator with a horseshoe mixer works with a constant rotation speed of 50 revolutions per minute. The horseshoe mixer is positioned just 1-2 mm above the bottom of the assay container. At the beginning of the test the torque is reset and then recorded over time. Therewith the developing of the relative viscosity can be observed. The experiment was stopped automatically if a torsional moment of 10 Ncm was achieved. For analysis the point of the first significant increase in slope is defined as the slurry-lifetime.

Measurement of the Cinematic Viscosity Using Zahn Cup—Method B

The experimental setup consists of
a roller
Polyethylen-bottle (2 L) (Bartelt) with cap
Zahncup Nr. 4 (ERICHSEN GMBH & CO KG)

An aqueous binder that consists of a fluorine containing additive and yttria powder as either described in the examples or described in the comparative examples below, are mixed in the PE-bottle with an agitator and then put on the roller that has a constant rotation speed. The rotation speed of the bottle is 16.5 rpm.

The slurry is stirred uniformly at room temperature and after one hour of stirring the start-viscosity is measured with Zahncup Nr. 4—unless otherwise noted (determining the efflux time in seconds). After approximately 6 to 8 hours another measurement is done, afterwards every 24 hours (relating to the starting time of the experiment—on working days only) one measurement is realised. One measurement with Zahncup Nr. 4 means that in each case 3 measurements are realised in succession and the average of these three measurements is defined as the measured efflux time. The stability of the slurry is proposed in % increase of the average efflux time used measured with Zahncup Nr. 4 related to the start viscosity (efflux time in seconds), determined after one hour.

In the following Examples all temperatures are in degrees Celsius.

Unless otherwise noted all fluorine doped yttria-based powders used in the examples indicated below are produced in the following way:

Appropriate quantities of fused block material of yttria are milled for 30 minutes in an yttria stabilized $ZrO_2$-lined ball mill (ZOZ GmbH TYP COMB 03-A039). Therefore 24.5 kg 1.25" grinding-balls (Yttria stabilized Zirconium Oxide) are used. After the addition of appropriate quantities of fluorine containing dopant the powder mixture is milled for another certain time interval (e.g. if $YF_3$ is used for 100 min, if Zirconiumoxyfluoride $Zr_7O_{8.79}F_{9.71}$ is used for 90 min) The milled product is sieved <75 μm and then calcined (Nabertherm C250; 3.0 kg per $Al_2O_3$(0.9)-mullite(0.1)-crucible). The heating rate is 1.1° C./min up to a temperature of 400° C. that was maintained for 4 hours.

Appropriate quantities of a fluorine containing compound is added to the aqueous binder system. In all examples the quantity of added fluorine compound is indicated in wt % (weight percent) in the binder system.

The slurry of the examples and optionally comparative examples is formed by mixing an aqueous based binder that contains a fluorine containing compound with a ceramic powder e.g. yttria, yttria-alumina-zirconia, yttria-alumina or yttria-zirconia, wherein yttria optionally is fluorine doped.

Unless otherwise indicated, the Ammonium Zirconium Carbonate solution used in the experiments is the product ®Bacote 20 from MEL Chemicals. Unless otherwise indicated, the Colloidal Silica binder used is ®Nexsil 12 (containing 30 wt % Silica as $SiO_2$) provided by Nyacol Nano Technologies, Inc.

The fluorine-contents of the powders that are indicated in the examples are according to the results of the chemical analysis of the materials used. The analysis was made by realising soda pulping, or soda potash pulping, respectively and by using an ion selective electrode.

EXAMPLE 1

Life Time Test (Method A)

250 g of fused yttria flour (<45 μm) were mixed with 52.5 g of ammonium zirconium carbonate and 22.5 g of an aqueous 10 g/L $NH_4F$-solution (puriss., ≧96%, Riedel-de Haën; 01108) were added. After about 5 hours the viscosity of the mixture started to increase (see FIG. 1).

COMPARATIVE EXAMPLE 1

Life Time Test (Method A)

250 g of fused yttria flour (<45 μm) were mixed with 52.5 g of ammonium zirconium carbonate and 22.5 g of deionised water. After 1 hour the viscosity increased dramatically (see FIG. 1).

EXAMPLE 2

Life Time Test (Method A)

250 g of 0.5 wt % F-doped yttria (dopant: zirconiumoxyfluoride $Zr_7O_{8.79}F_{9.71}$) were mixed with 62.5 g of ammonium zirconium carbonate that contained 0.5 wt % NaF (GR for analysis ACS, ISO, Reag. Ph. Eur, Merck, 106449). The start viscosity did not change for 124 hours. Afterwards the torque and therewith the viscosity increased dramatically (see FIG. 2).

COMPARATIVE EXAMPLE 2

Life Time Test (Method A)

250 g of 0.5 wt % F-doped yttria (dopant: zirconiumoxyfluoride $Zr_7O_{8.79}F_{9.71}$) were mixed with 62.5 g of ammonium zirconium carbonate. The viscosity started to increase very slightly after about 15 hours, after 40 hours the viscosity increased dramatically (see FIG. 2).

EXAMPLE 3

Life Time Test (Method A)

250 g of fused yttria flour (<45 μm) were mixed with 62.5 g colloidal silica, that contained 0.36 wt % $NH_4F$ (puriss. p.a., ACS reagent, ≧96.0% (F), Riedel de Haen; 01108). After about 50 hours the viscosity started to increase (see FIG. 3).

COMPARATIVE EXAMPLE 3

Life Time Test (Method A)

250 g of fused yttria flour (<45 μm) were mixed with 62.5 g colloidal silica. After 8 hours the torque rose up to 10 Ncm (see FIG. 3).

EXAMPLE 4

Life Time Test (Method B)

1500 g of 0.5 wt % F-doped yttria (dopant: zirconiumoxyfluoride $Zr_7O_{8.79}F_{9.71}$) were mixed with 429.8 g of ammonium zirconium carbonate containing 1.0 wt % NH$_4$F (puriss. p.a., ACS reagent, ≧98.0% (F), Fluka, 09737). After 24 hours the start viscosity increased by 3%, after 16 days the viscosity increased by 80% (see FIG. 4).

COMPARATIVE EXAMPLE 4

Life Time Test (Method B)

1500 g of 0.5 wt % F-doped yttria (dopant: zirconiumoxyfluoride Zr$_7$O$_{8.79}$F$_{9.71}$) were mixed with 429.8 g of ammonium zirconium carbonate. After 24 hours the viscosity increased by 50% (see FIG. 4).

EXAMPLE 5

Life Time Test (Method B)

1500 g of 0.5 wt % F-doped yttria (dopant: yttrium fluoride) were mixed with 429.8 g of ammonium zirconium carbonate containing 1.0 wt % NH$_4$F (puriss. p.a., ACS reagent, ≧98.0% (F), Fluka, 09737). After 9 days the viscosity increased by 36% (see FIG. 5).

EXAMPLE 6

Life Time Test (Method B)

1500 g of 0.5 wt % F-doped yttria (dopant: yttrium fluoride) were mixed with 429.8 g of ammonium zirconium carbonate containing 5.0 wt % of ammonium hydrogen difluoride (puriss. p.a., ≧98.5% (F), Fluka). After 24 hours the viscosity rose up to 5%, after 4 days the viscosity increased by 28% (see FIG. 6).

EXAMPLE 7

Life Time Test (Method B)

1500 g of 0.5 wt % F-doped yttria (dopant: yttrium fluoride) were mixed with 429.8 g of ammonium zirconium carbonate containing 10.0 wt % of NH$_4$F (puriss. p.a., ACS reagent, ≧98.0% (F), Fluka, 09737). After 24 hours the viscosity increased by 7%, after 2 days the increase of the viscosity was 30% (see FIG. 7).

EXAMPLE 8

Life Time Test (Method B)

1500 g of 0.5 wt % F-doped yttria (dopant: yttrium fluoride) were mixed with 429.8 g of ammonium zirconium carbonate containing 11.9 wt % of NH$_4$F (puriss. p.a., ACS reagent, ≧98.0% (F), Fluka. 09737). After 24 hours the viscosity increased by 27%, after 2 days the increase of the viscosity was 88% (see FIG. 7).

EXAMPLE 9

Life Time Test (Method B)

1500 g of 0.5 wt % F-doped yttria (dopant: yttrium fluoride) were mixed with 429.8 g of ammonium zirconium carbonate containing 13.5 wt % of NH$_4$F (puriss. p.a., ACS reagent, ≧98.0% (F), Fluka. 09737). After 24 hours the viscosity decreased by 4%, after 2 days the viscosity increased by 133% (see FIG. 7).

COMPARATIVE EXAMPLE 5

Life Time Test (Method B)

1500 g of 0.5 wt % F-doped yttria (dopant: yttrium fluoride) were mixed with 429.8 g of ammonium zirconium carbonate. After 24 hours the start viscosity increased by 99% (see FIG. 5).

EXAMPLE 10

Life Time Test (Method B)

1500 g of 1.7 wt % F-doped yttria (dopant: zirconiumoxyfluoride Zr$_7$O$_{8.79}$F$_{9.71}$) were mixed with 429.8 g of ammonium zirconium carbonate containing 5 wt % of NH$_4$F (puriss. p.a., ACS reagent, ≧98.0% (F), Fluka, 09737). After 22 days the viscosity increased by 15%, after 42 days the increase of the viscosity was 30% (see FIG. 8).

EXAMPLE 11

Life Time Test (Method B)

1500 g of 1.7 wt % F-doped yttria (dopant: zirconiumoxyfluoride Zr$_7$O$_{8.79}$F$_{9.71}$) were mixed with 429.8 g of ammonium zirconium carbonate containing 11.9 wt % of NH$_4$F (puriss. p.a., ACS reagent, ≧98.0% (F), Fluka, 09737). After 2 days the viscosity increased by 21% (see FIG. 9).

EXAMPLE 12

Life Time Test (Method B)

1500 g of 1.7 wt % F-doped yttria (dopant: zirconiumoxyfluoride Zr$_7$O$_{8.79}$F$_{9.71}$) were mixed with 429.8 g of ammonium zirconium carbonate containing 13.5 wt % of NH$_4$F (puriss. p.a., ACS reagent, ≧98.0% (F), Fluka, 09737). After 22 days the viscosity increased by 16% (see FIG. 9).

COMPARATIVE EXAMPLE 6

Life Time Test (Method B)

1500 g of 1.7 wt % F-doped yttria (dopant: zirconiumoxyfluoride Zr$_7$O$_{8.79}$F$_{9.71}$) were mixed with 429.8 g of ammonium zirconium carbonate. After 22 days the start viscosity increased by 94% (see FIG. 8 and FIG. 9).

EXAMPLE 13

Life Time Test (Method B)

1200 g of fused yttria flour (<4 μp m) were mixed with 360 g of ammonium zirconium carbonate containing 1.5 wt % of NH$_4$F (puriss., ≧96%, Riedel-de Haën; 01108). After 24 hours the viscosity increased by 46% (see FIG. 10).

EXAMPLE 14

Life Time Test (Method B)

1200 g of fused yttria flour (<45 μm) were mixed with 360 g of ammonium zirconium carbonate containing 3.1 wt % of NH$_4$F (puriss., ≧96%, Riedel-de Haën; 01108). After 24 hours the viscosity increased by 43% (see FIG. 10).

EXAMPLE 15

Life Time Test (Method B)

1200 g of fused yttria flour (<4 μp m) were mixed with 360 g of ammonium zirconium carbonate containing 11.5 wt % of NH$_4$F (puriss., ≧96%, Riedel-de Haën; 01108). After 22 hours the viscosity increased by 45% (see FIG. 10).

COMPARATIVE EXAMPLE 7

Life Time Test (Method B)

1200 g of fused yttria flour (<45 μm) were mixed with 360 g of ammonium zirconium carbonate. Because of the expected rapid increase of the slurry viscosity the start viscosity was determined with Zahncup Nr. 4 after 5 minutes. After 1 hour the viscosity increased by ~62% (within the three Zahncup Nr. 4 measurements done after 1 hour a fluctuation of about 6 seconds of efflux time was observed, the slurry viscosity increased after each single measurement). After 2 hours no more measurements with Zahncup Nr. 4 could be realised because of the extremely high viscosity of the slurry. The nozzle of the Zahncup got chocked immediately (see FIG. 10).

EXAMPLE 16

Life Time Test (Method B)
1500 g of 0.5 wt % F-doped yttria (dopant: yttrium fluoride) were mixed with 429.8 g of Colloidal Silica containing 0.20 wt % of $NH_4F$ (puriss. p.a., ACS reagent, ≧98.0% (F), Fluka, 09737). After 24 days the viscosity increased by 7%, after 32 days the increase of the viscosity was 18% (see FIG. 11).

COMPARATIVE EXAMPLE 8

1200 g of 0.5 wt % F-doped yttria (dopant: yttrium fluoride) were mixed with 343.8 g of Colloidal Silica After 24 days the viscosity increased by 23%, after 30 days the increase of the viscosity was 52%.

EXAMPLE 17

Life Time Test (Method B)
1200 g of 0.5 wt % F-doped yttria (dopant: yttrium fluoride) were mixed with 343.8 g of ammonium zirconium carbonate containing 0.1 wt % of $NH_4F$ (puriss. p.a., ACS reagent, ≧98.0% (F), Fluka, 09737). After 30 hours the viscosity increased by 35%, after 46.8 hours the viscosity increased by 58% (see FIG. 7).

EXAMPLE 18

Life Time Test (Method B)
1500 g of 0.5 wt % F-doped yttria (dopant: yttrium fluoride) were mixed with 343.8 g of ammonium zirconium carbonate containing 5.0 wt % of $NH_4F$ (puriss. p.a., ACS reagent, ≧98.0% (F), Fluka, 09737). After about 10 minutes further 86.0 g of ammonium zirconium carbonate containing 5.0 wt % of $NH_4F$ (puriss. p.a., ACS reagent, ≧98.0% (F), Fluka, 09737) were added. After 46 hours the PE-bottle was taken unintendly from the roller. The PE-bottle was put on the roller once again after about 27 hours standing without mixing. Then it was put on the roller again. Afterwards the viscosity was measured as usual. 4 days after preparation of the slurry no increase of viscosity could be observed. After 11 days the viscosity has increased by 32%. After 13.9 days an increase of viscosity by 55% was observed.

EXAMPLE 19

Life Time Test (Method B)
1500 g of fused yttria flour (<45 μm) were mixed with 429.8 g of ammonium zirconium carbonate containing 1.0 wt % of ammonium hydrogen difluoride (puriss. p.a., ≧98.5% (F), Fluka). After 24 hours the viscosity increased by 67% (see FIG. 12).

EXAMPLE 20

Life Time Test (Method B)
1500 g of fused yttria flour (<45 μm) were mixed with 429.8 g of ammonium zirconium carbonate containing 5.0 wt % of ammonium hydrogen difluoride (puriss. p.a., ≧98.5% (F), Fluka). After 24 hours the viscosity increased by 44%, after 45.5 hours the viscosity increased by 96%. % (see FIG. 12).

EXAMPLE 21

Life Time Test (Method B)
1500 g of fused yttria flour (<4 μp m) were mixed with 343.8 g of ammonium zirconium carbonate containing 10.0 wt % of ammonium hydrogen difluoride (puriss. p.a., ≧98.5% (F), Fluka). After about 5 minutes further 86.0 g of ammonium zirconium carbonate containing 10.0 wt % of ammonium hydrogen difluoride (puriss. p.a., ≧98.5% (F), Fluka) were added. After 6 hours the viscosity increased by 61%, after 24 hours the increase of the viscosity was 162% (see FIG. 12).

EXAMPLE 22

Life Time Test (Method B)
1200 g of fused yttria flour (<45 μm) were mixed with 343.8 g of Colloidal Silica containing 0.8 wt % of $NH_4F$ (puriss. p.a., ACS reagent, ≧98.0% (F), Fluka, 09737). After 7 hours the viscosity increased by 20%, after 22.5 hours the increase of the viscosity was 64%. After 46.5 hours the viscosity increase in comparison to the starting viscosity was 53%. Surprisingly the viscosity of the slurry decreased furthermore after 5.9 days. that means the viscosity increase in comparison to the starting viscosity was 34% after 5.9 days. After 18.9 days an increase of viscosity of 41% could be observed (see FIG. 13).

EXAMPLE 23

1200 g of fused yttria flour (<45 μm) were mixed with 343.8 g of Colloidal Silica containing 1.0 wt % of $NH_4F$ (puriss. p.a., ACS reagent, ≧98.0% (F). Fluka. 09737). After 4 hours the viscosity increased by 49%. Surprisingly a decrease of the slurry viscosity was observed after 19 hours, that means the viscosity increase in comparison to the starting viscosity was 2% after 19 hours. After 11.8 days a viscosity decrease of 40% in comparison to the starting viscosity was observed. After 18.8 days a decrease in viscosity of 31% could be observed (see FIG. 14).

EXAMPLE 24

Life Time Test (Method B)
1200 g of fused yttria flour (<45 μm) were mixed with 343.8 g of Colloidal Silica containing 1.0 wt % of ammonium hydrogen difluoride (puriss. p.a., ≧98.5% (F), Fluka). After 18.9 days a decrease in viscosity of 1% could be observed (see FIG. 15).

COMPARATIVE EXAMPLE 9

Life Time Test (Method B)
1200 g of fused yttria flour (<4 μp m) were mixed with 343.8 g of Colloidal Silica. After 4 hours the visvosity increased by 87%.

EXAMPLE 25

Life Time Test (Method A)
250 g of fused yttria flour (<45 μm) were mixed with 62.5 g colloidal silica, that contained 0.5 wt % $NH_4F$ (puriss. p.a., ACS reagent, ≧98.0% (F), Fluka, 09737). No significant increase of the viscosity could be observed for about 187 hours. After 187 hours the experiment was stopped (see FIG. 3).

Figure 1:
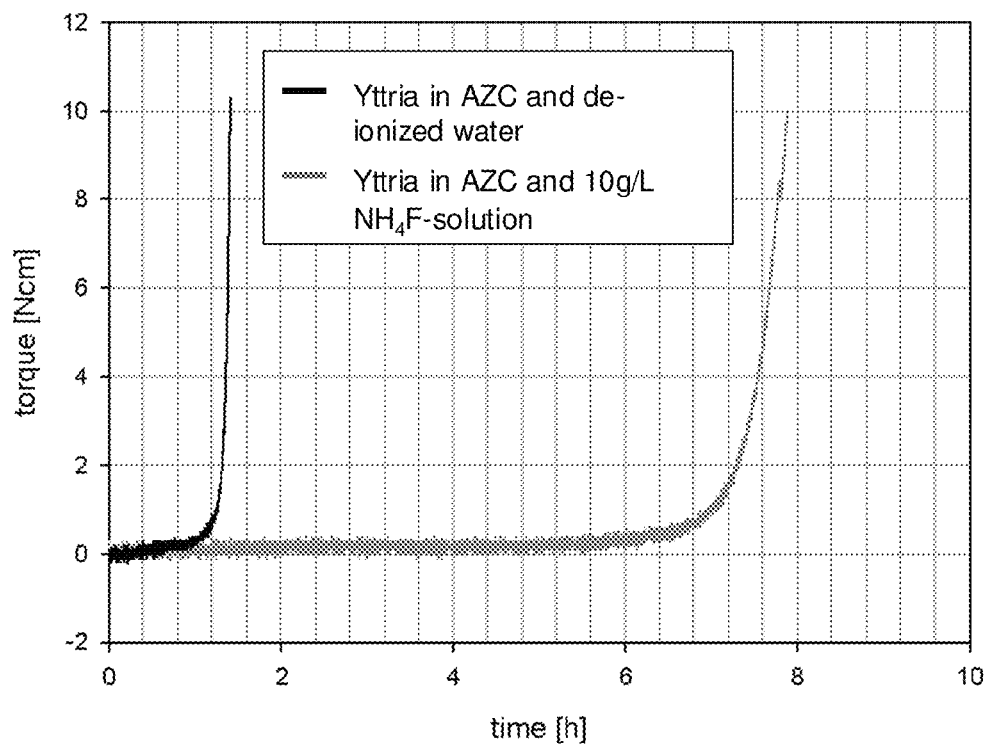
FIG. 1 shows the results of the slurry lifetime-test (Method A) of Yttria in Ammonium Zirconium Carbonate and deionized water in comparison with Yttria in Ammonium Zirconium Carbonate and 10 g/L Ammonium fluoride solution.
Figure 2:
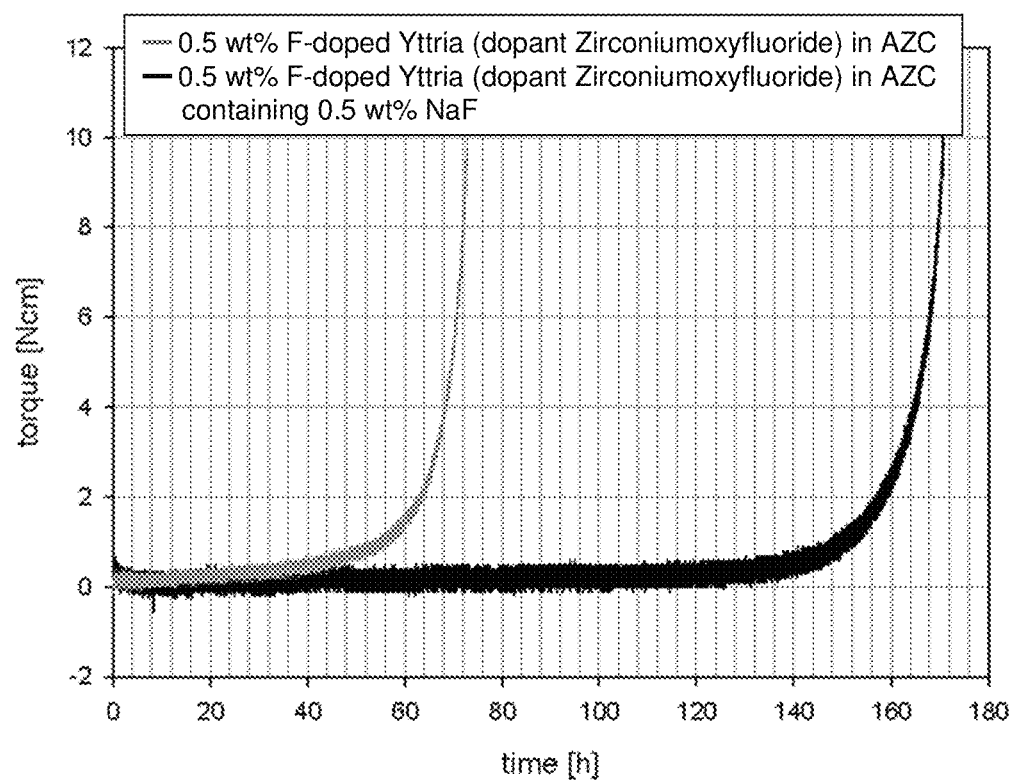
FIG. 2 shows the results of the slurry lifetime-test (Method A) of 0.5 wt % F-doped Yttria (dopant Zirconiumoxyfluoride) in Ammonium Zirconium Carbonate in comparison with 0.5 wt % F-doped Yttria (dopant Zirconiumoxyfluoride) in Ammonium Zirconium Carbonate containing 0.5 wt % Sodium fluoride.
Figure 3:
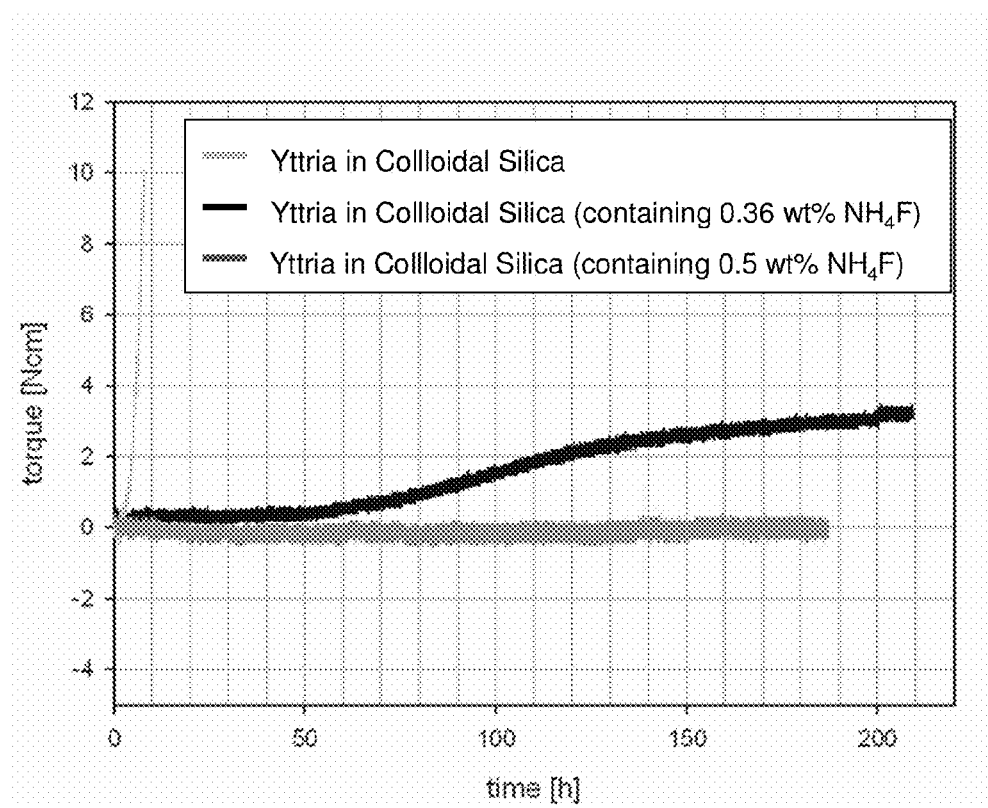
FIG. 3 shows the results of the slurry lifetime-test (Method A) of Yttria in Colloidal Silica in comparison with Yttria in Colloidal Silica containing 0.36 wt %, or 0.5 wt % of Ammonium fluoride.
Figure 4:
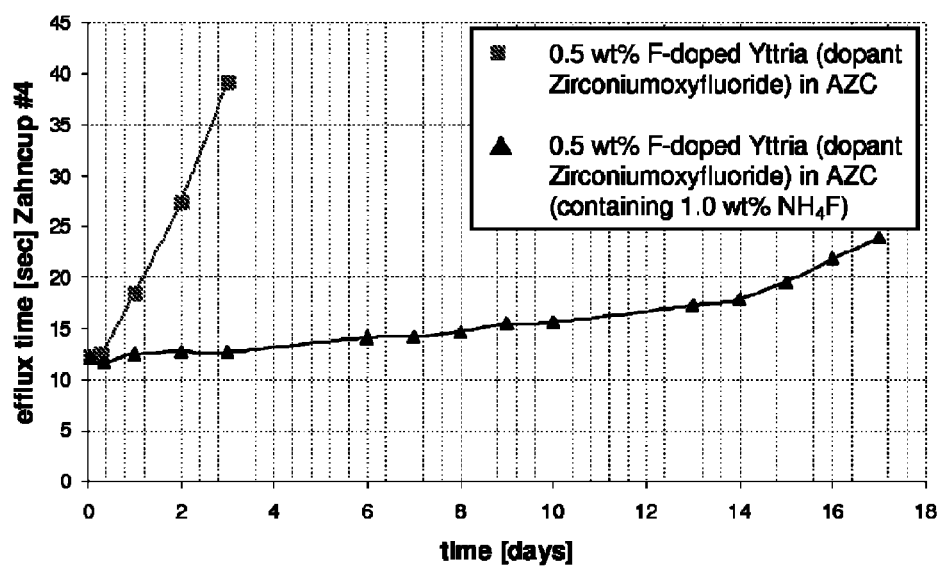
FIG. 4 shows the results of the slurry lifetime-test (Method B) of 0.5 wt % F-doped Yttria (dopant Zirconiumoxyfluoride) in Ammonium Zirconium Carbonate in comparison with 0.5 wt % F-doped Yttria (dopant Zirconiumoxyfluoride) in Ammonium Zirconium Carbonate containing 1 wt % Ammonium fluoride.
Figure 5:
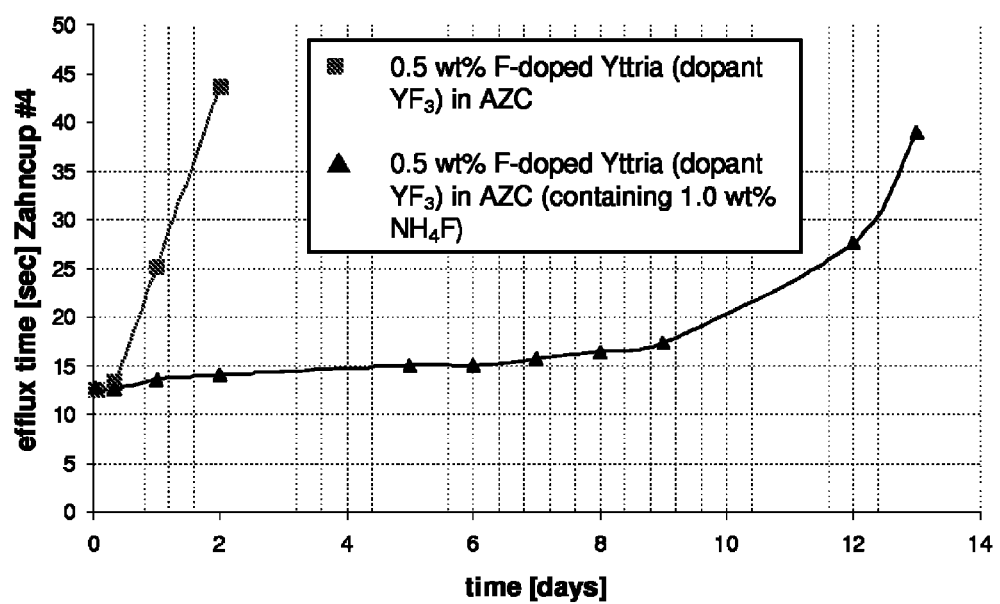
FIG. 5 shows the results of the slurry lifetime-test (Method B) of 0.5 wt % F-doped Yttria (dopant Yttrium fluoride) in Ammonium Zirconium Carbonate in comparison with 0.5 wt % F-doped Yttria (dopant Yttrium fluoride) in Ammonium Zirconium Carbonate containing 1 wt % Ammonium fluoride.
Figure 6:
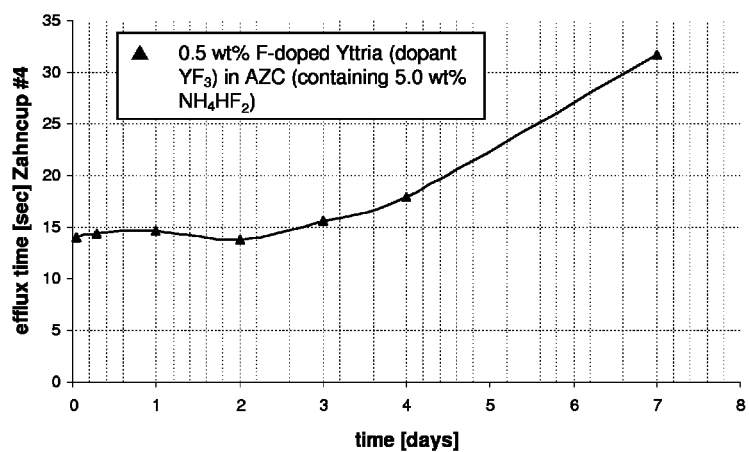
FIG. 6 shows the results of the slurry lifetime-test (Method B) of 0.5 wt % F-doped Yttria (dopant Yttrium fluoride) in Ammonium Zirconium Carbonate containing 5.0 wt % of Ammonium hydrogen difluoride.
Figure 7:
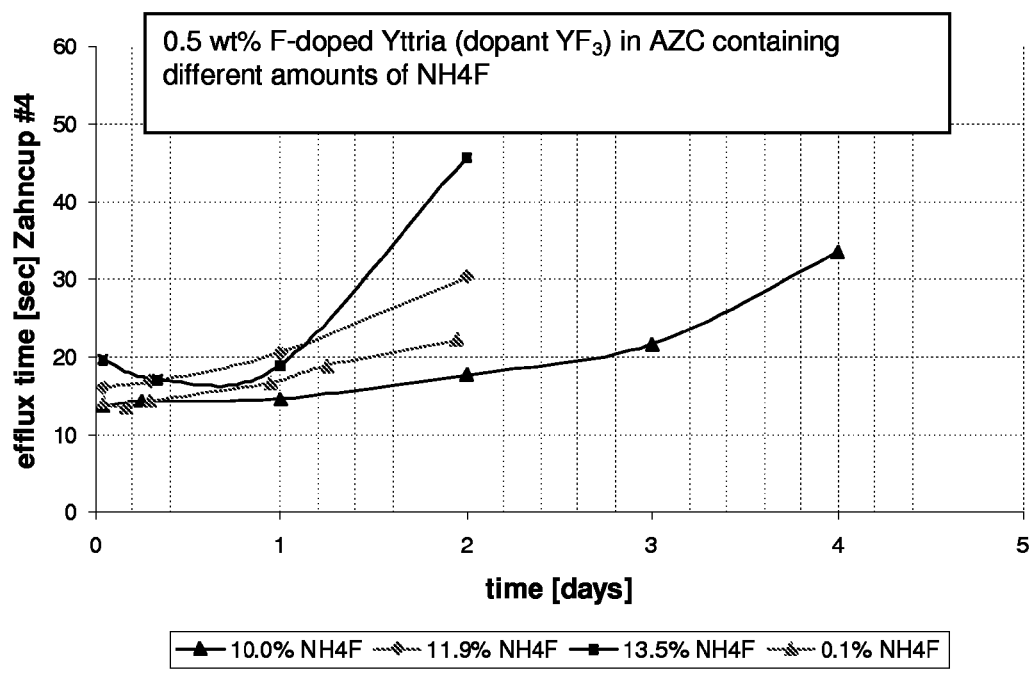
FIG. 7 shows the results of the slurry lifetime-test (Method B) of 0.5 wt % F-doped Yttria (dopant Yttrium fluoride) in Ammonium Zirconium Carbonate containing either 0.1 wt %, 10.0 wt %, 11.9 wt % or 13.5 wt % of Ammonium fluoride.
Figure 8:
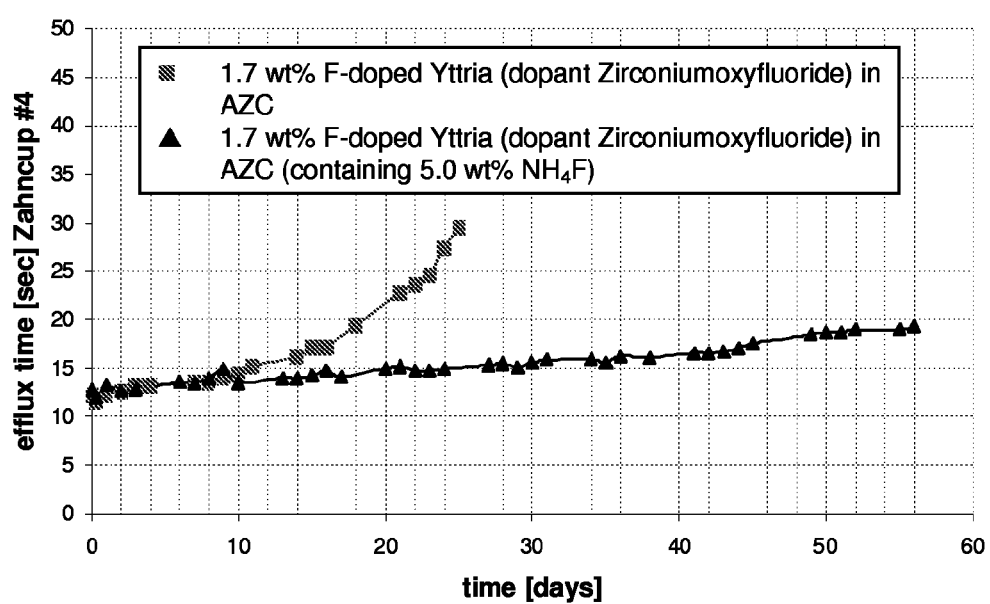
FIG. 8 shows the results of the slurry lifetime-test (Method B) of 1.7 wt % F-doped Yttria (dopant Zirconiumoxyfluoride) in Ammonium Zirconium Carbonate in comparison with 1.7 wt % F-doped Yttria (dopant Zirconiumoxyfluoride) in Ammonium Zirconium Carbonate containing 5 wt % Ammonium fluoride.
Figure 9:
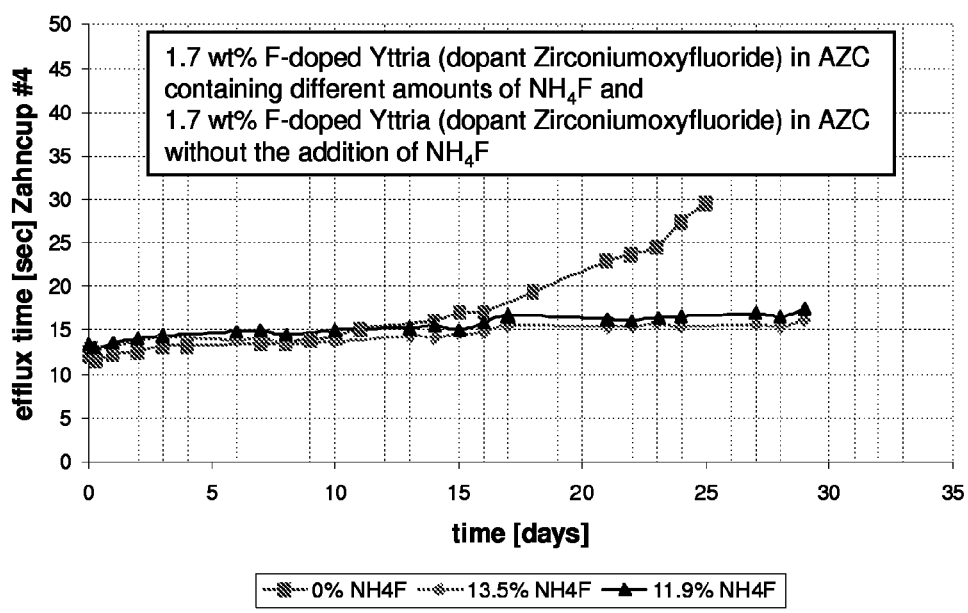
FIG. 9 shows the results of the slurry lifetime-test (Method B) of 1.7 wt % F-doped Yttria (dopant Zirconiumoxyfluoride) in Ammonium Zirconium Carbonate, in comparison with 1.7 wt % F-doped Yttria (dopant Zirconiumoxyfluoride) in Ammonium Zirconium Carbonate containing 11.9 wt % Ammonium fluoride and in comparison with 1.7 wt % F-doped Yttria (dopant Zirconiumoxyfluoride) in Ammonium Zirconium Carbonate containing 13.5 wt % Ammonium fluoride.
Figure 10:
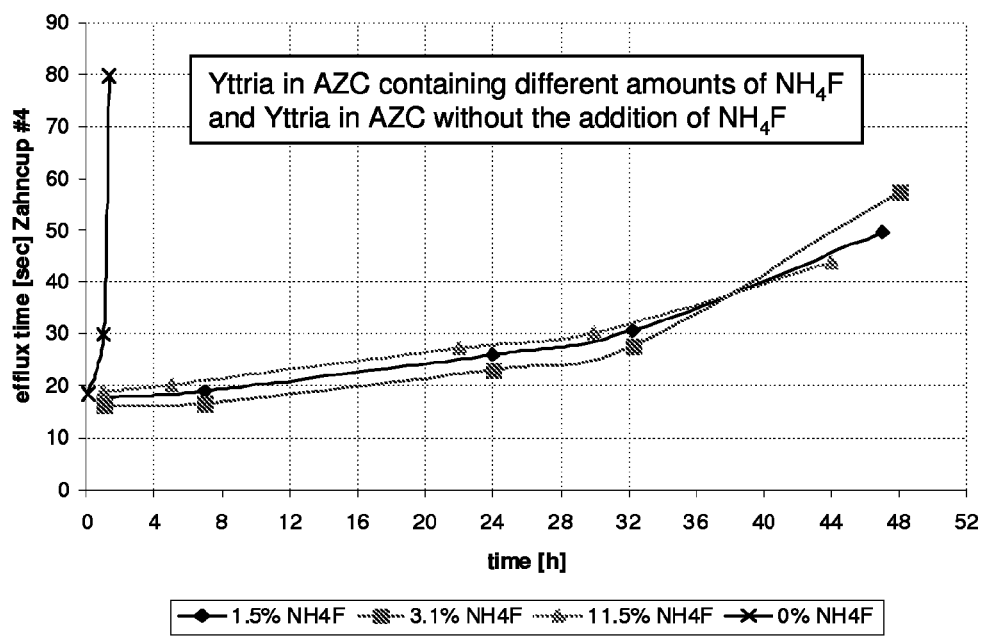
FIG. 10 shows the results of the slurry lifetime-test (Method B) of Yttria in Ammonium Zirconium Carbonate containing no Ammonium fluoride, in comparison with Yttria in Ammonium Zirconium Carbonate containing 1.5 wt % Ammonium fluoride, Yttria in Ammonium Zirconium Carbonate containing 3.1 wt % Ammonium fluoride and Yttria in Ammonium Zirconium Carbonate containing 11.5 wt % Ammonium fluoride.
Figure 11:
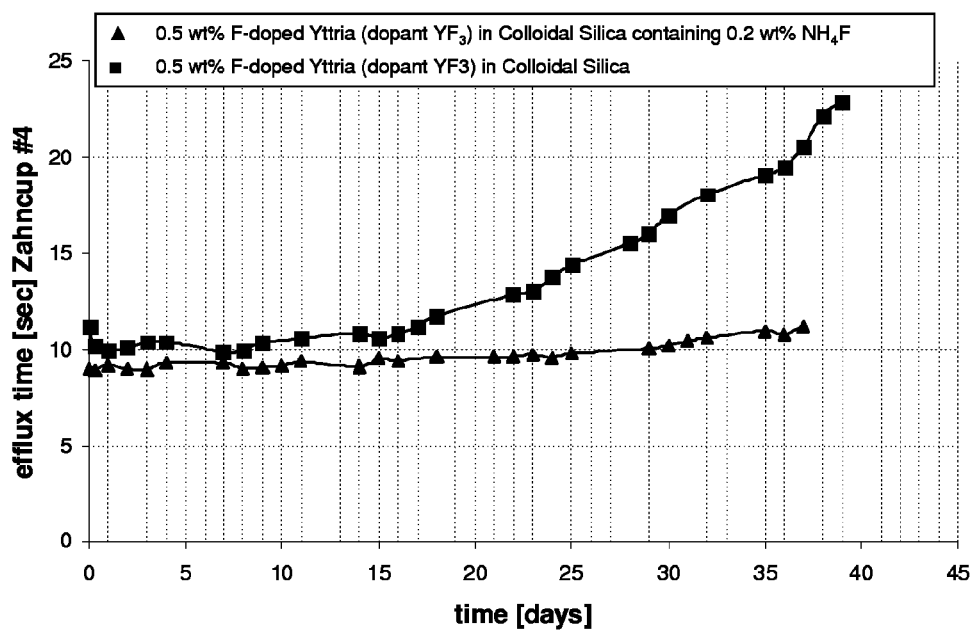
FIG. 11 shows the results of the slurry lifetime-test (Method B) with 0.5 wt % F-doped Yttria (dopant Zirconiumoxyfluoride) in Colloidal Silica without Ammonium fluoride (Comparative Example 8) and containing 0.2 wt % Ammonium fluoride.
Figure 12:
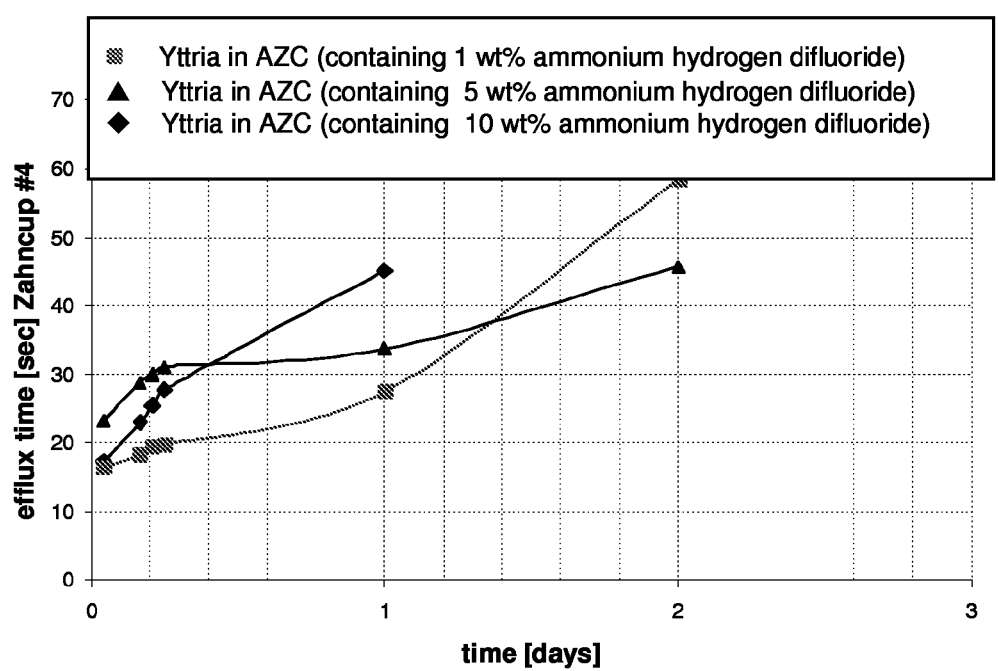
FIG. 12 shows the results of the slurry lifetime-test (Method B) of Yttria in Ammonium Zirconium Carbonate containing 1.0 wt %, 5.0 wt % or 10.0 wt %, of Ammonium hydrogen difluoride.
Figure 13:
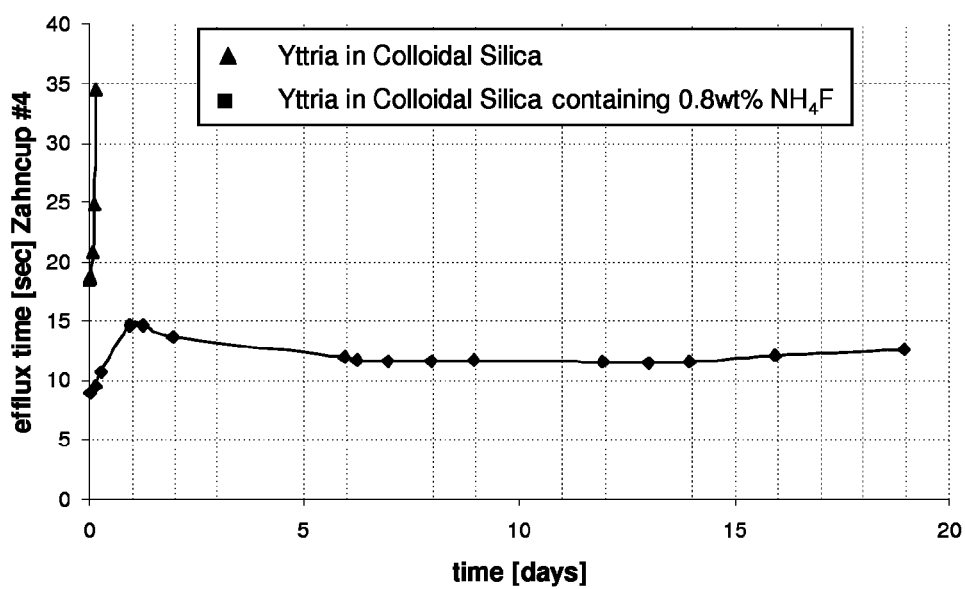
FIG. 13 shows the results of the slurry lifetime-test (Method B) of Yttria in Colloidal Silica, with and without 0.8 wt % of $NH_4F$.
Figure 14:
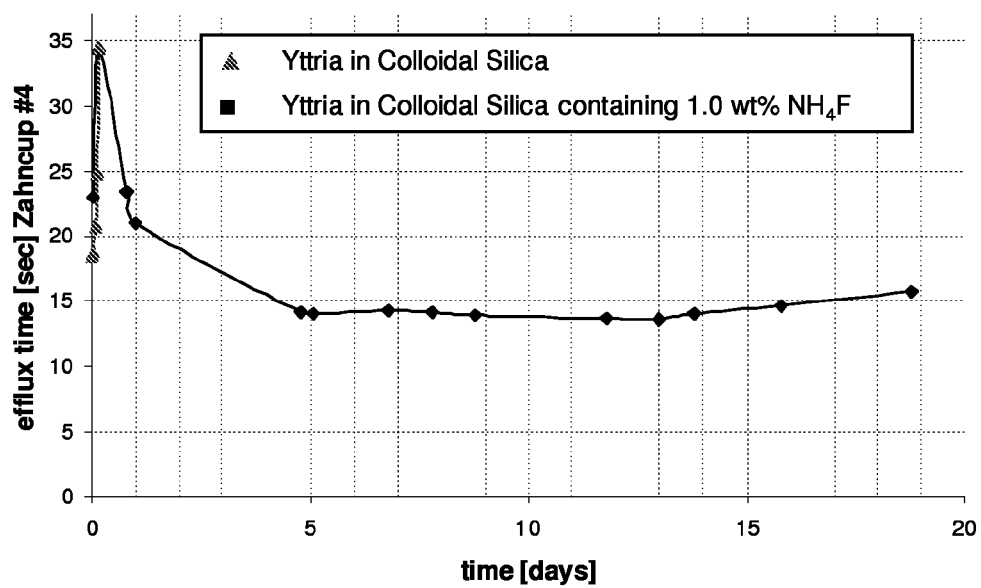
FIG. 14 shows the results of the slurry lifetime-test (Method B) of Yttria in Colloidal Silica, with and without 1.0 wt % of $NH_4F$.
Figure 15:
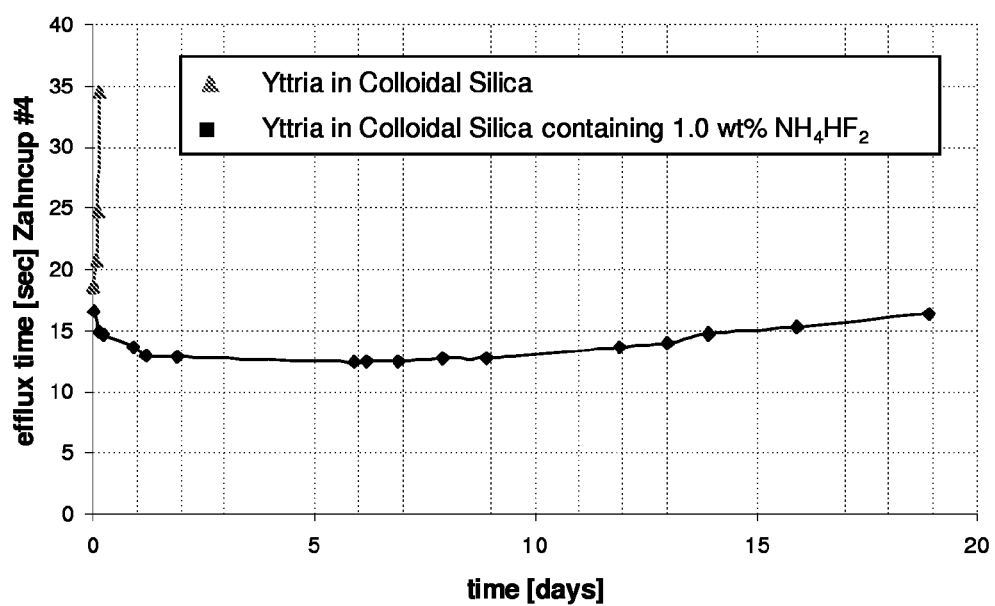
FIG. 15 shows the results of the slurry lifetime-test (Method B) of Yttria in Colloidal Silica, with and without 1.0 wt % of $NH_4HF_2$.

The invention claimed is:

1. A slurry composition comprising 50 to 85 wt. % of yttria and 15 to 50 wt. % of an aqueous silica binder system or an aqueous ammonium zirconium carbonate binder system which binder system comprises 0.05 to 15 wt. % of a fluorine compound, wherein the fluorine compound is selected from ammonium fluoride, ammonium hydrogen difluoride, sodium fluoride, potassium fluoride, sodium hydrogen difluoride and/or potassium hydrogen difluoride.

2. A composition according to claim 1, wherein the fluorine compound is present in an amount such that the fluorine compound is dissolved in the binder system.

3. A composition according to claim 1, wherein the fluorine compound is added in an amount such that the binder system remains free from precipitation upon addition of the fluorine compound for at least 2 hours at room temperature.

4. A composition according to claim 1, wherein the fluorine compound is added in an amount such that the aqueous binder system used remains free of gelation upon addition of the fluorine compound for at least 2 hours at room temperature.

5. A composition according to claim 1, wherein the yttria comprises yttria in the form of yttria-based powder, optionally doped with fluorine.

6. A composition according to claim 5, wherein the yttria-doped with fluorine is obtainable by:
   (a) mixing particles of yttria and a fluorine containing dopant, and
   (b) heating the resulting mixture to effect fluorine-doping of said yttria.

7. A composition according to claim 1, wherein said yttria comprises 50 to 100 wt % $Y_2O_3$, 0 to 50 wt % $Al_2O_3$ and 0 to 50 wt % $ZrO_2$.

8. A composition according to claim according to claim 7, wherein said yttria is $Y_2O_3$, a Y/Al/Zr-oxide, a Y/Al-oxide or a Y/Zr-oxide or combinations thereof.

9. A composition according to claim 6, wherein said fluorine containing dopant is one of the group consisting of $YF_3$, $AlF_3$, $ZrF_4$, a lanthanide fluoride and a zirconiumoxyfluoride.

10. A composition according to claim 1, wherein the composition comprises yttria in the form of a solid solution in combination with other metal oxides.

11. A composition according to claim 10, comprising a solid solution of at least 50 wt % yttria, 0 to 50 wt % alumina and 0 to 50% wt % zirconia.

12. A method of stabilizing a slurry composition comprising 50 to 85 wt. % of yttria and 15 to 50 wt. % of an aqueous silica binder system or an aqueous ammonium zirconium carbonate binder system, which method comprises:
   treating the composition with a fluorine compound in an amount of 0.05 to 15 wt. % of the binder system, wherein the fluorine compound is selected from ammonium fluoride, ammonium hydrogen difluoride, sodium fluoride, potassium fluoride, sodium hydrogen difluoride and/or potassium hydrogen difluoride and optionally mixing the mixture of the binder system comprising the fluorine compound with yttria.

* * * * *

UNITED STATES PATENT AND TRADEMARK OFFICE
CERTIFICATE OF CORRECTION

| | |
|---|---|
| PATENT NO. | : 8,500,898 B2 |
| APPLICATION NO. | : 13/377786 |
| DATED | : August 6, 2013 |
| INVENTOR(S) | : Raunig et al. |

It is certified that error appears in the above-identified patent and that said Letters Patent is hereby corrected as shown below:

In the Specification

Column 1
Line 49, change "helps preventing" to --helps prevent--
Line 50, change "which are necessary" to --which is necessary--
Line 62, change "significant improved shelf life" to --significantly improved shelf life--

Column 2
Line 1, change "beside" to --besides--

Column 3
Line 36, change "(0.0254 mm)" to --(0.0254 mm).--
Line 40, change "Group Ma" to --Group IIIa--

Column 4
Line 24, change "encompasses" to --encompass--
Line 54, change "further including" to --further include--

Column 5
Line 47, change "is such, that" to --is such that--

Column 6
Line 5, change "e.g. if the binder system is AZC" to --e.g.--
Lines 19-20, change "e.g. if the binder system is colloidal silica" to --e.g.--
Line 31, change "Other ingredients include such as" to --Other ingredients are--
Line 32, change "herein and ingredients which" to --herein which--
Line 33, change "e.g. such as usual in the Investment" to --such as usual ingredients in the investment--
Line 49, change "is sdetermined" to --are determined--

Signed and Sealed this
First Day of April, 2014

Michelle K. Lee
*Deputy Director of the United States Patent and Trademark Office*

CERTIFICATE OF CORRECTION (continued)
U.S. Pat. No. 8,500,898 B2

Line 55, change "Plexiglas" to --Plexiglass--

Column 7
Line 54, change "used for 90 min) The" to --used for 90 min). The--
Line 60, change "is added" to --are added--

Column 11
Line 47, change "taken unintendly" to --taken unintendedly--

Column 12
Line 3, change "96%. %" to --96%.--
Line 28, change "Surprinsingly" to --Surprisingly--
Lines 28-29, change "furthermore" to --further--
Line 39, change "Surprinsingly" to --Surprisingly--